(12) United States Patent
Lavanture

(10) Patent No.: US 6,521,371 B1
(45) Date of Patent: Feb. 18, 2003

(54) BATTERY TRAY

(76) Inventor: Richard A. Lavanture, 56260 County Rd. 19, Bristol, IN (US) 46507

( * ) Notice: Subject to any disclaimer, the term of this patent is extended or adjusted under 35 U.S.C. 154(b) by 98 days.

(21) Appl. No.: 09/724,155

(22) Filed: Nov. 28, 2000

(51) Int. Cl.$^7$ ................................. H01M 2/10

(52) U.S. Cl. .................. 429/100; 429/96; 429/186; 429/97; 180/68.5

(58) Field of Search ............... 180/68.5; 429/96, 429/100, 1, 8, 97, 186

(56) References Cited

U.S. PATENT DOCUMENTS

| | | |
|---|---|---|
| 721,032 A | 2/1903 | Farmer |
| 978,251 A | 12/1910 | Whitney |
| 1,052,449 A | 2/1913 | Beck |
| 1,285,162 A | 11/1918 | Hellweg |
| 2,022,595 A | 11/1935 | Gowing ..................... 136/181 |
| 2,032,591 A | 3/1936 | Pride ......................... 280/179 |
| 2,094,329 A | 9/1937 | Mascuch .................... 136/166 |
| 2,707,721 A | 5/1955 | Anderson et al. ........... 136/166 |
| D175,331 S | 8/1955 | Beverlin ........................ D26/6 |
| 2,823,843 A | 2/1958 | Beverlin ........................ 224/49 |
| D183,359 S | 8/1958 | Mallory ......................... D26/6 |
| 3,420,382 A | 1/1969 | McClendon .................. 211/26 |
| 3,437,164 A | 4/1969 | Rabjohn .................... 180/68.5 |
| 3,618,759 A | 11/1971 | Kolasinski et al. ........ 206/63 B |
| 3,821,996 A | 7/1974 | Hollins ...................... 180/68.5 |
| 3,821,998 A | 7/1974 | Hollins ...................... 180/68.5 |
| D235,454 S | 6/1975 | Lindow ......................... D26/6 |
| 4,098,366 A | 7/1978 | Reinhard et al. .......... 180/68.5 |
| D252,354 S | 7/1979 | Uyeda .......................... D3/30 |
| 4,206,274 A | * 6/1980 | Peels ...................... 429/100 X |
| 4,327,809 A | 5/1982 | Fenstermaker ............ 180/68.5 |
| 4,367,572 A | 1/1983 | Zielenski ..................... 24/301 |

(List continued on next page.)

FOREIGN PATENT DOCUMENTS

| | | |
|---|---|---|
| AU | 280461 | 9/1965 |
| FR | 682794 | 10/1929 |
| FR | 879978 | 3/1942 |
| FR | 1267153 | 12/1958 |
| FR | 1325771 | 3/1962 |
| GB | 9740 | 3/1911 |
| GB | 293945 | 7/1928 |
| GB | 465956 | 6/1937 |
| GB | 2072409 | 9/1981 |
| SU | 1388336 | 5/1985 |

OTHER PUBLICATIONS

Battery Holder Catalog Brochure 1987, T–H Marine Supplies, Madson Alabama, 1987–2 pages. (no month).

Hercules Cellulose Nitrate Brochure 1943, Hercules Powder Company, Wilmington, Delaware, 1943–1 page, (No month).

*The British Plastics Industry in War Time*—Modern Plastics, vol. 17, Dec. 1939–1 page.

Battery Boxes—Attwood Catalog, p. 249, date unknown.

*Primary Examiner*—John S. Maples
(74) *Attorney, Agent, or Firm*—Van Dyke, Gardner, Linn & Burkhart, LLP

(57) ABSTRACT

An adaptable battery tray for supporting a battery includes a body having a pair of end walls and side walls, with each end wall rotatably attached to an adapter. The adapter is rotatable between a first position and a second position. In the first position, the adapters are external to the interior of the battery tray and permits the battery tray to support a battery having dimensions approximating the dimensions between the side walls and the end walls. When a battery of lesser length is to be supported, the adapters are rotated into the second position, and include a pair of stop plates which define therebetween a wall suitable for housing the battery of lesser dimensions.

38 Claims, 6 Drawing Sheets

U.S. PATENT DOCUMENTS

| | | | |
|---|---|---|---|
| 4,445,585 A | 5/1984 | Imani | 180/68.5 |
| 4,529,053 A | 7/1985 | Tucker | |
| 4,756,415 A | 7/1988 | Call | 206/333 |
| 4,883,725 A | 11/1989 | Gérard | 429/99 |
| 4,936,409 A | 6/1990 | Nix et al. | |
| 5,036,938 A | 8/1991 | Blount et al. | 180/208 |
| 5,037,711 A | 8/1991 | Bonnaud et al. | 429/156 |
| 5,308,717 A | 5/1994 | Gordin | 429/99 |
| D348,046 S * | 6/1994 | Hulsebus | D13/119 |
| 5,415,955 A * | 5/1995 | Kobayashi et al. | 429/97 |
| 5,484,667 A | 1/1996 | Sahli et al. | |
| 5,508,124 A * | 4/1996 | Gordecki et al. | 429/97 |
| 6,102,356 A | 8/2000 | Huntley et al. | 248/500 |

\* cited by examiner

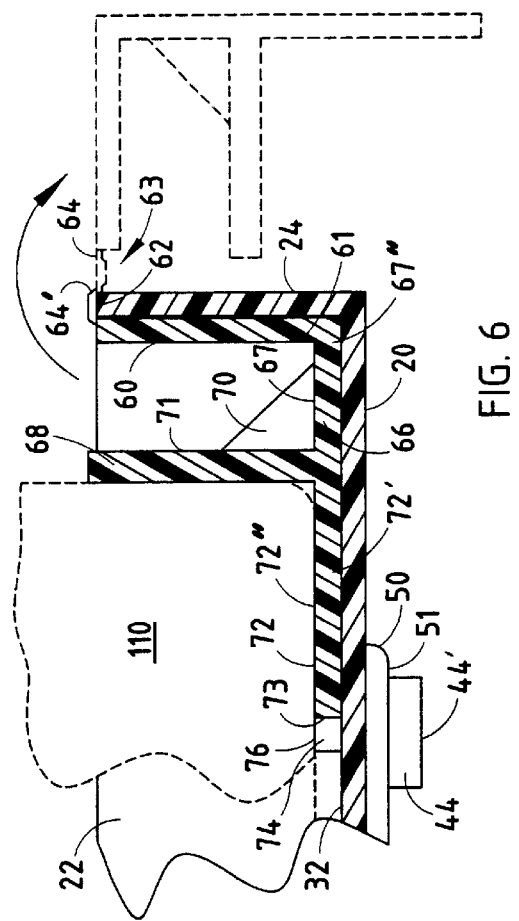
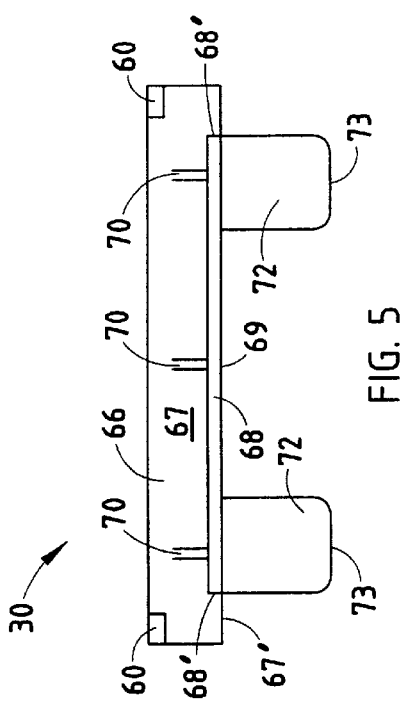
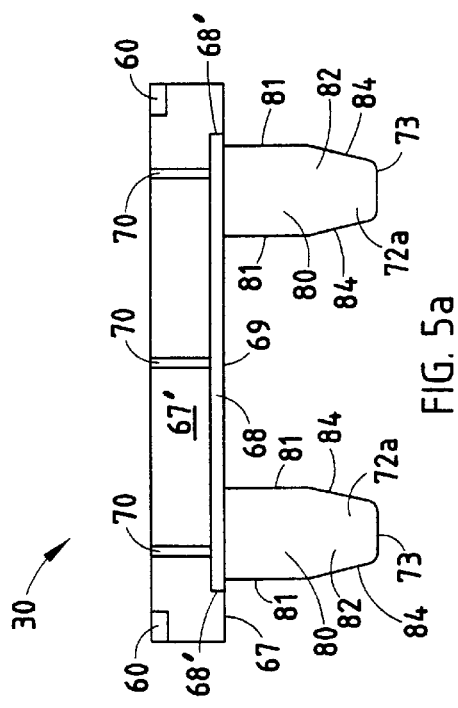

BATTERY TRAY

BACKGROUND OF THE INVENTION

The invention relates generally to trays for batteries, and in particular, to an adaptable battery tray capable of securely supporting batteries of different dimension.

Lead acid batteries are used in a wide variety of vehicles powered by a combustion engine. In order to assure safe and reliable operation, the battery is normally positioned in some form of receptacle which is secured to the vehicle, while a securing member such as a tie or clamp is used to secure the battery to the receptacle.

Depending upon the vehicle in which it is used, the receptacle may take the form of a container which completely encloses the battery. The container is formed with orifices dimensioned to permit battery's the electrical contacts to extend therethrough. More often than not, in the interest of cost and safety, the receptacle assumes the form of a tray dimensioned to receive the particular battery.

In marine applications, given the particular hazards caused by the potential for exposure to water, the tray includes side walls of sufficient height to prevent the splashing of water onto the battery itself. Moreover, the use of receptacles in the form of a container are prohibited as they present a fire hazard. This fire hazard stems from the possibility of combustible gases, in particular, hydrogen gas released by the battery, becoming trapped by the container. Electrical shorts or sparks from the battery may in turn ignite the combustible gases, resulting in an explosion. Thus, current regulations require the use of a battery tray which enables the majority of the battery to be exposed to the environment and prohibits the use of encapsulating or encasing receptacles.

Competition among battery manufacturers has resulted in the availability of batteries having different dimensions. Batteries of different dimension have presented a problem for the manufacturers of the battery trays in that such manufacturers are relegated to producing a battery tray for each particular battery size, or a single tray with a removable insert dimensioned to accommodate batteries of lesser size than the original dimensions of the tray. Neither of these solutions is acceptable, as both require the battery tray manufacturer to incur additional costs either in the production of separate trays, or the removable inserts.

In marine applications, the two most common sizes are a Group 30, and Group 24 battery, as defined by the Battery Council International. Group 24 batteries express a smaller length from end-to-end, but are substantially equal in length from front-to-back as a Group 30 battery. Furthermore, manufacturers of marine battery trays are required to conform to the criteria set out by Title 33 Code of Federal Regulations §183.420 set forth below:

(a) Each installed battery must not move more than one inch in any direction when a pulling force of 90 pounds or twice the battery weight, whichever is less, is applied through the center of gravity of the battery as follows:
  (1) Vertically for the duration of one minute.
  (2) Horizontally and parallel to the boat's center line for a duration of one minute fore and one minute aft.
  (3) Horizontally and perpendicular to the boat's center line for a duration of one minute to starboard and one minute to port.
(b) Each battery must be installed so that metallic objects cannot come in contact with the ungrounded battery terminals.
(c) Each metallic fuel line and fuel system component within 12 inches and above the horizontal plane of the battery surface as installed must be shielded with dielectric material.
(d) Each battery must not be directly above or below a fuel tank, fuel filter, or fitting in a fuel line.
(e) A vent system or other means must be provided to permit the discharge from the boat of hydrogen gas released by the battery.
(f) [Reserved]
(g) Each battery terminal connector must not depend on spring tension for its mechanical connection to the terminal.

Consequently, there exists in the industry a need for a battery tray configured to adaptively receive batteries of different dimension, which is cost effective to manufacture.

SUMMARY OF THE INVENTION

According to one aspect of the invention, an adaptable battery tray comprises a body having a bottom, and a pair of opposing end walls defining an interior. At least one adapter is movably attached to the body and is movable from a first position external to the interior of the body, to a second position wherein the at least one adapter is positioned within the interior of the body. Utilizing at least one adapter which, when in use, is external to the body, and which can be moved into the interior of the body to define a second, or use, position provides a cost effective and reliable adaptable battery tray capable of effectively accommodating batteries of differing dimension.

According to another aspect of the invention, an adaptable battery tray comprises a body having a bottom, a pair of opposing side walls, and a pair of opposing end walls defining an interior. The body is dimensioned to receive a first battery, and includes a pair of adapters, with each adapter being rotatably attached to an end wall of the pair of end walls. The adapters are rotatable to a use position within the interior of the body, and are configured to permit the body to receive a second battery having a length less than the first battery. The use of a pair of adapters rotatably attach to the body permits the battery tray of the present invention to accommodate batteries of different size without using a separate insert, and thus reduces the cost of manufacturing.

According to yet another aspect of the invention, a battery tray comprises a bottom, a pair of end walls, and a pair of side walls extending from the bottom, and a pair of adapters. Each adapter is rotatably attached to an end wall, and is rotatable into a use position. Each adapter includes at least one hinge member rotatably attached to one of the end walls, and a stop plate coupled to the at least one hinge member. The stop plate is substantially parallel to the pair of opposing end walls when the adapter is in the use position. The use of a pair of adapters, each of which is formed with a stop plate collectively defines a pair of secondary end walls which reliably secure a battery having a length less than the length between the opposing end walls.

According to a further aspect of the invention, an adaptable battery tray comprises a body having an interior, an interior surface, a pair of opposing ends and at least one adapter movably attached to the body. The at least one adapter is movable from a first position external to the interior of the body to a second position wherein the at least one adapter is positioned within the interior of the body. The body and the at least one adapter are formed of a polymeric material in a unitary construction and meet the requirements of Title 33 C.F.R. §183.420. The unitary, polymeric construction of an adaptable battery tray having at least one adapter configured to accommodate batteries of different dimension which also meets the criteria outlined in 33 C.F.R. §183.420 represents an advancement in the art in that the battery tray of the present invention is economical to manufacture, safe and reliable.

These and other objects, advantages, purposes and features of the invention will become apparent upon review of the following specification in conjunction with the drawings.

BRIEF DESCRIPTION OF THE DRAWINGS

FIG. 5 is a detailed plan view of the adapter;

FIG. 5a is the same view as FIG. 5, according to an alternative preferred embodiment;

FIG. 6 is a sectional view taken along the line VI—VI of FIG. 2 with the adapter shown in phantom in the first position;

DETAILED DESCRIPTION OF THE PREFERRED EMBODIMENTS

Figure 1:
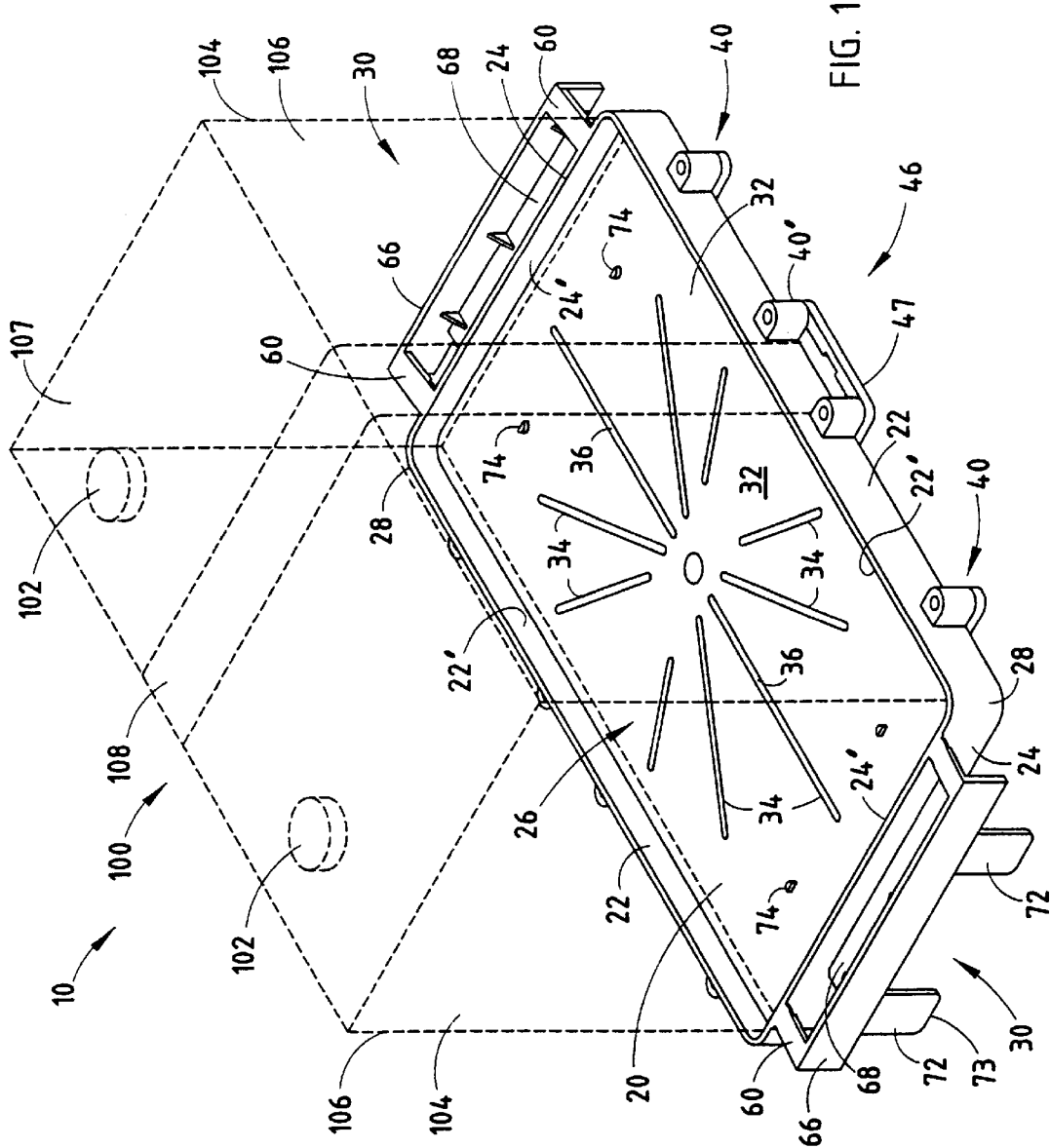
FIG. 1 is a perspective view of a battery tray with a battery positioned therein and illustrated in phantom with the adapters illustrated in a first position, according to the invention.

The present invention is an adaptable battery tray which can be adapted to accept batteries of different dimension. The battery tray of the present invention ray be used in conjunction with any battery for any type of vehicle, however, it is particularly suited for marine vehicle batteries, and in one preferred form, is adaptable to accept either a Group 24 or a Group 30 battery.

Referring now to the drawings, and the illustrative embodiments depicted therein, a battery tray 10 is of generally a rectangular shape and includes a bottom 20, a pair of opposing side walls 22 and a pair of opposing end walls 24. Side walls 22, and end walls 24 project substantially orthogonally from bottom 20 and collectively with bottom 20 define an interior 26. Preferably, the intersection of side walls 22 and end walls 24 define rounded corners 28. Each end wall 24 is a attached to an adapter 30.

As depicted in FIG. 1, adapters 340 are positioned external to interior 26 of tray 10, and when so positioned, permits tray 10 to receive a battery 100. Battery 100 is of a conventional type having positive and negative terminals 102. Battery 100 is securely held within interior 26 of battery tray 10, with the distance between ends 104 of battery 100 being slightly less than the distance between the interior surfaces of end walls 24. Moreover, the distance between sides 106 is slightly less than the distance between the interior surfaces of side walls 22 such that ends 104 and sides 106 of battery 100 are proximate to end walls 24 and side walls 22, respectively of battery tray 10.

Interior surface, 32 of battery tray 10 includes a plurality of ribs 34. The top surfaces 36 of rib 34 lie generally in a single plane, and together define a floor upon which the bottom of battery 100 is supported. Ribs 34, as they provide an elevated floor upon which battery 100 sits, permit any water within tray 10 to reside below battery 100. Ribs 34 also provide structural integrity and increase the strength of battery 10. Preferably, ribs 34 extend in a generally modified radial pattern with ends 34' being substantially co-planar, while ends 34" are also substantially co-planar. However, it will be recognized by those with ordinary skill in the art that other configurations for ribs 34 may be employed without departing from the spirit and scope of the invention.

Battery tray 10 includes a plurality of securing members 40 for attachment to a generally planar surface of a vehicle (not shown). Securing members 40 are defined by a first member 42 extending from exterior surfaces 23 of side walls 22. The bottom of each first member 42 is molded to a second member 44. Second members 44 are attached to, and depend a preselected distance from, exterior surface 38 of bottom 20. A pair of tie down members 46 are formed on side walls 22 and bottom 20. Each tie down member 46 includes a pair of spaced securing members 40' having substantially the same construction as securing members 40. A bridge member 47 is attached between securing members 40' and is substantially parallel to side walls 22 and positioned a preselected distance therefrom to define a channel 48. A plurality of ribs 50 project from exterior surface 38 of bottom 20. Second members 44 of securing members 40, 40' define a generally planar contact surface which engages the floor of the vehicle (not shown) in which battery tray 10 is positioned. As shown in FIG. 6, the bottom surface 44' of second members 44 lie in a plane below edges 51 of ribs 50. Ribs 50 project in a modified radial pattern from exterior surface 38 of bottom 20, with ends 50' of ribs 50 defining a channel 55 therebetween.

In order to secure battery 100 to battery tray 10, a securing member 108, normally in the form of a belt, is positioned around exterior surface 107 of battery 100 and is threaded through channels 48 formed by bridge members 47. Securing member 108 fits within the channel 55 formed by ribs 50. Thereafter, securing member 108 can be tightened about battery 100 to thereby securely hold battery tray 10 to battery 100. Each securing member 40, 40' is formed with an aperture 58 with an axis generally parallel to side walls 22. Apertures 58 are formed to receive fasteners (not shown) so that battery tray 10 may be secured to a vehicle. Once secured, the contact surface defined by second members 44 of securing members 40, 40' raise battery tray 10 a preselected distance above the vehicle floor so that any fluids positioned under exterior surface 38 of bottom 20 may evaporate. It will be recognized by those with ordinary skill in the art that securing member 108 is but one illustrative securing method, and that the present invention is not limited thereby. Other securing methods may be substituted for securing member 108 without departing from the spirit and scope of the invention.

Each adapter 30 includes a pair of hinged members 60 placed in spaced relation along top edge 62 of end wall 24. Hinging attachment between hinge member 60 and edge 62 of end wall 24 is accomplished by any hinge 63 commonly encountered in the art. Preferably, hinging attachment between hinge member 60 and edge 62 is accomplished by a living hinge defined by pair of spaced apart regions 64 of reduced thickness, within region 64' attached to edge 62. Hinge members 60 are attached to a connector or first member 66 at ends 61. First member 66 is a substantially planar and projects substantially orthogonally from ends 61 of hinge members 60. Surface 67 of first member 66 has projecting therefrom, in a substantially orthogonal direction, a stop member or plate 68. Stop plate 68 has a front surface 69 which is essentially planar with edge 67' of first member 66 (FIG. 5). Reinforcing members 70 are attached to rear surface 71 of stop plate 68 and surface 67 of first member 66.

Figure 8:
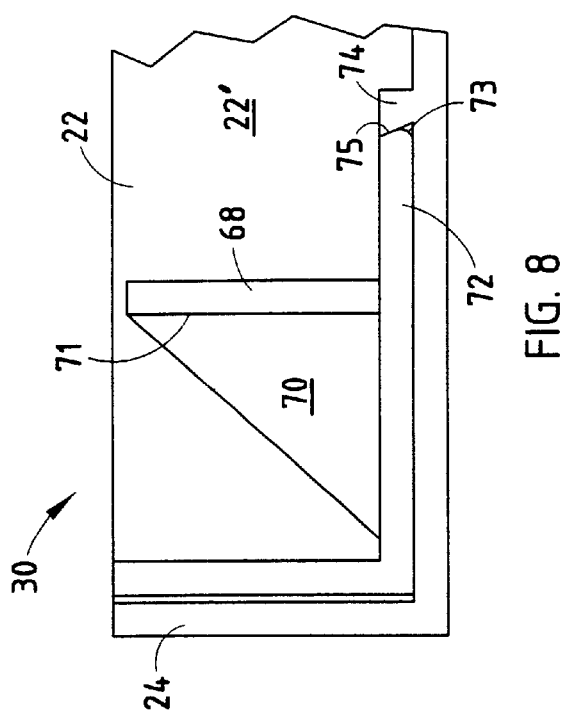
FIG. 8 is a sectional view taken along the line VIII—VIII of FIG. 7.
Figure 7:
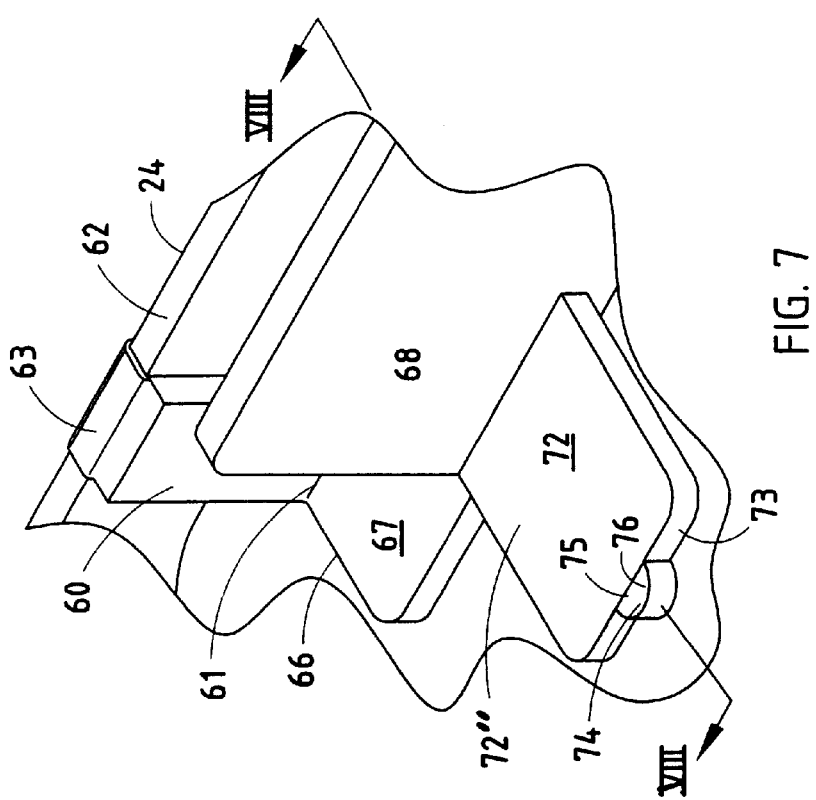
FIG. 7 is a detailed perspective view illustrating the adapter engaging a receiving pin.

A pair of tabs 72, placed in spaced relation, extend from edge 67' of first member 66 and are substantially orthogonal to stop plate 68. Tabs 72 are generally rectangular in shape. In the alternative preferred embodiment, as shown in FIG. 5a, tabs 72a have a generally linear section 80 defined by parallel edges 81 and a tapered section 82 defined by tapering edges 84 which terminate at end 73. Tabs 72a are longer in length, as defined between front surface 69 of stop plate 68 and end 73, than tabs 72. The greater length of tabs 72a enable battery tray 10 to accommodate batterys having a smaller lengthwise direction. Interior surface 32 of bottom 20 is formed having receiving pins 74 placed a preselected distance from end walls 24. Each receiving pin 74 preferably has a half-moon shape with the linear section 75 facing end walls 24. Receiving pins 74 are located in interior surface 32 such that they frictionally receive or provide an interference fit with ends 73 of tabs 72, 72a. Also, as illustrated in FIG. 8, preferably, linear section 75 of receiving pin 74 is not vertical, or is slanted towards end wall 24. The slant of linear section 75 provides a barrier to the removal of adapters 30 from the use position by requiring a force to be exerted on tabs 72, 72a to move them in an upward direction.

In operation, if a battery having the dimensions of battery 100 is to be used, adapters 30 are rotated to a first or external position as depicted in FIG. 1. When in the first position, battery 100 is positioned within interior 26 of tray 10 with ends 102 positioned proximate to interior surfaces 24' of end walls 24 and sides 106 positioned proximate to interior surfaces 22' of side walls 22. Thereafter, battery 100 may be secured to battery tray 10 using securing member 108, or other securing method commonly utilized in the art. Once battery 100 is secured to battery tray 10, battery tray 10 may be secured to a vehicle by placing fasteners throughout apertures 58 of securing members 40, 40'.

If adapters 30 are unnecessary, as when a battery 100 is supported, adapters 30 can be removed from battery tray 10, by cutting or manually tearing adapters 30 from battery tray 10 along region 64 of reduced thickness of hinge 63.

Figure 2:
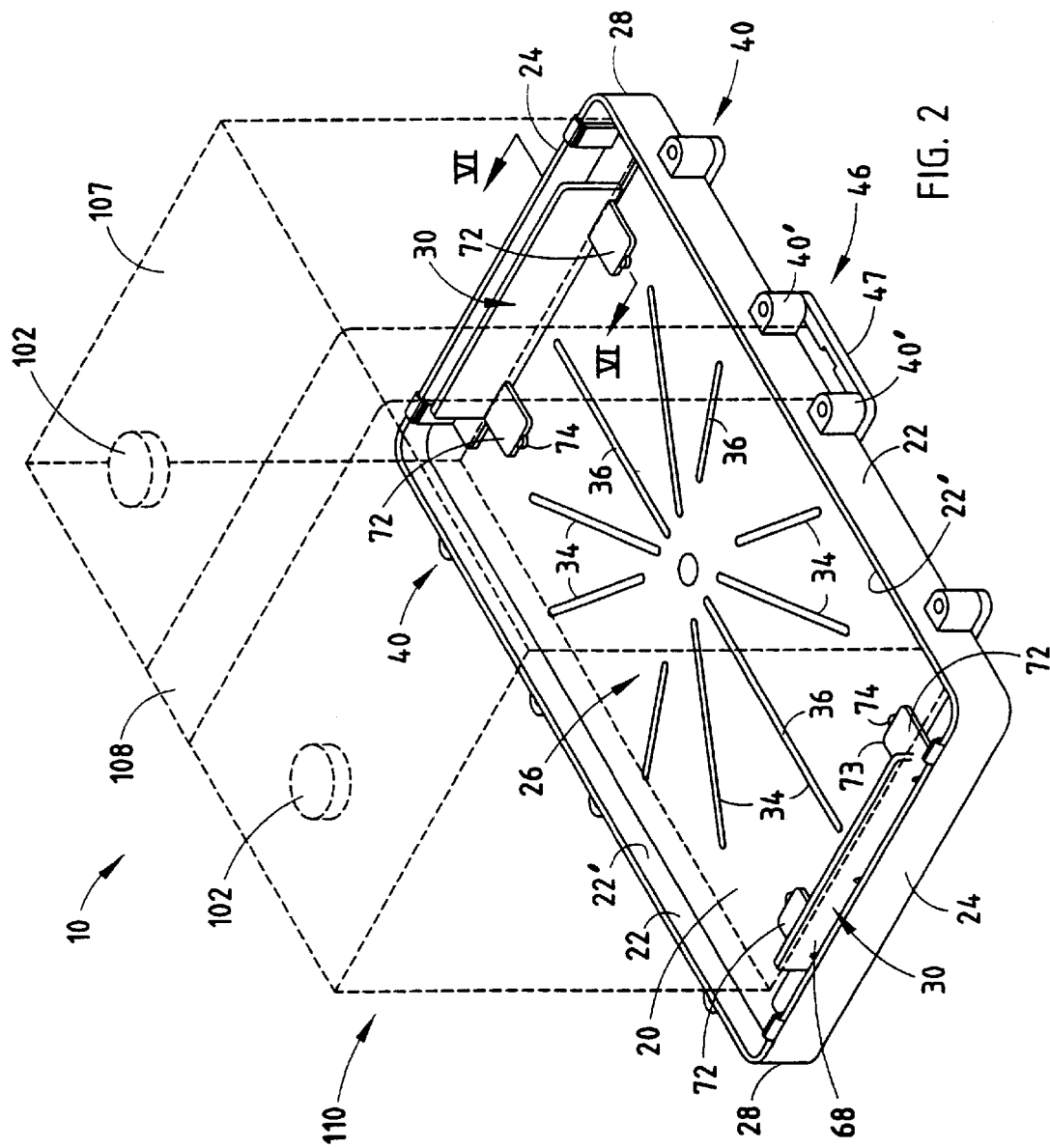
FIG. 2 is the same view as FIG. 1, with the adapters illustrated in a second position and supporting a battery having different dimensions than the battery of FIG. 1.
Figure 3:
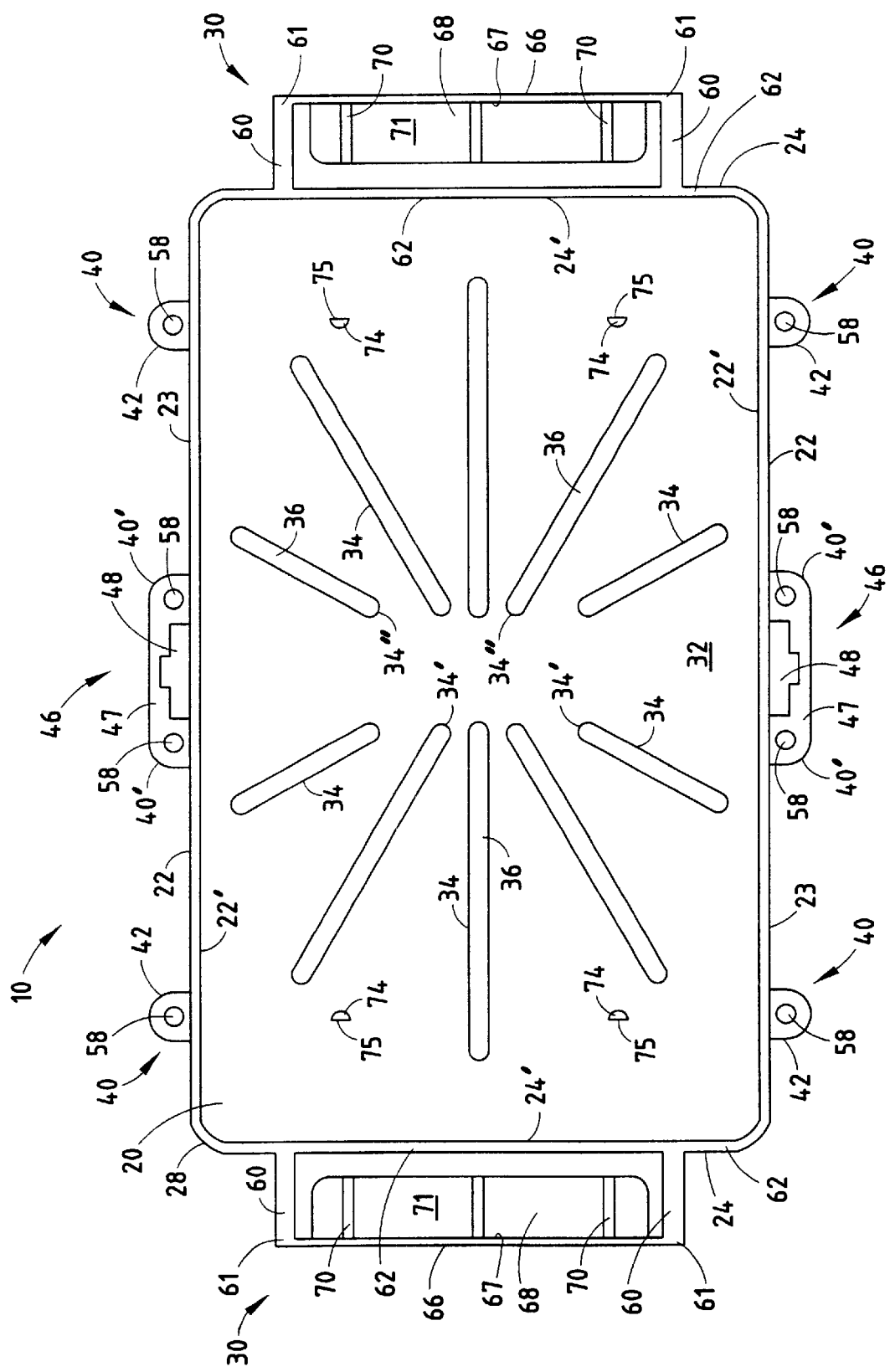
FIG. 3 is a plan view of the battery tray of FIGS. 1 and 2.
Figure 4:
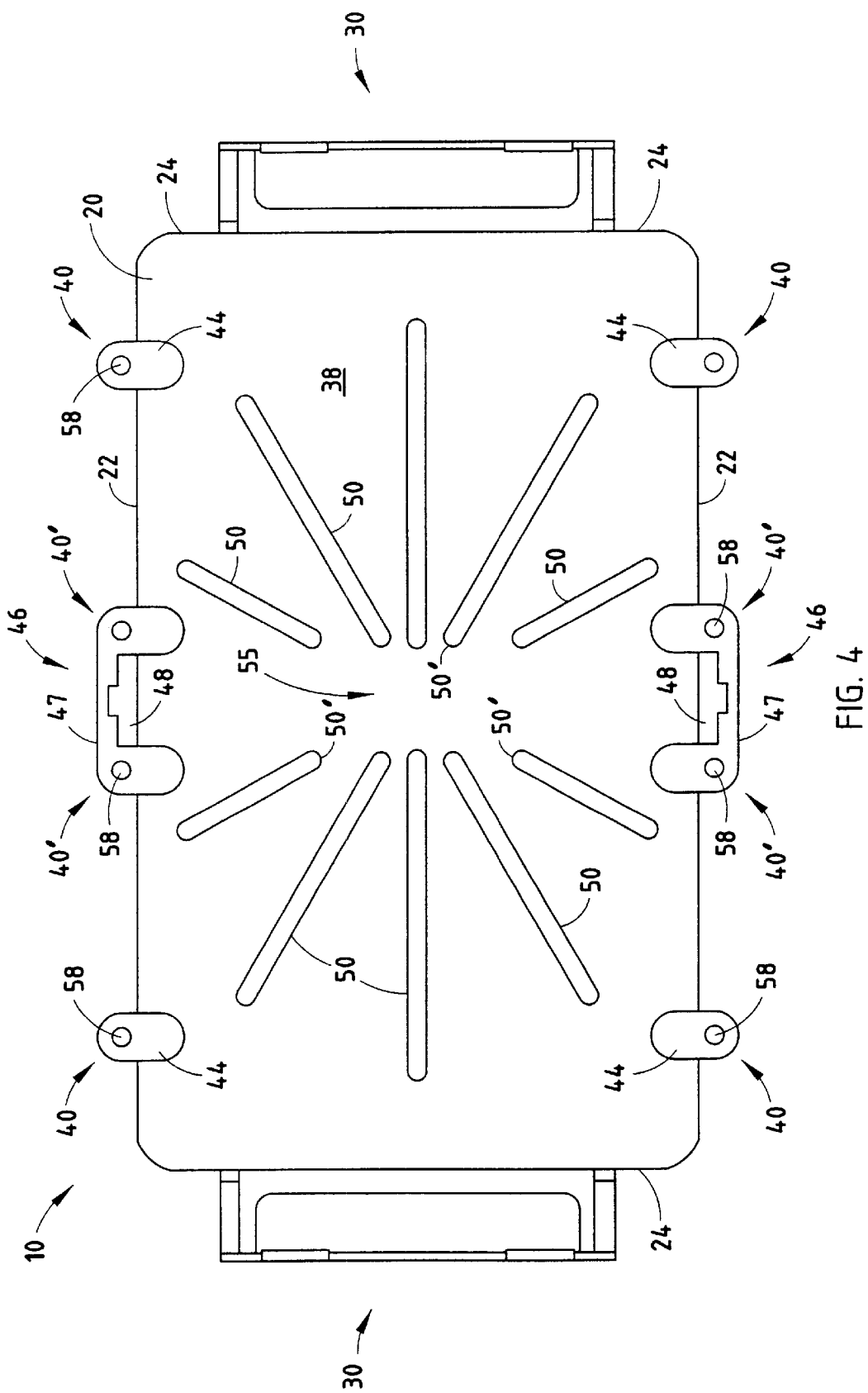
FIG. 4 is a bottom view of the battery tray of FIGS. 1 through 3.

As depicted in FIG. 2, if a battery 110 is to be placed within battery tray 10, adapters 30 are rotated into a second or use position with tabs 72 or 72a frictional gaging receiving pins 74. In the use position, as depicted most clearly in FIG. 6, bottom surface 67" of first member 66 and bottom surface 72' of tabs 72 or 72a are in abutting contact with interior surface 32 of bottom 20, while stop plate 68 is substantially parallel with end walls 24. Also when in the use position, top surface 72" of tabs 72 or 72a are substantially co-planar with top surfaces 36 of ribs 34, and top surface 76 of receiving pins 74. Once adapters 30 are in the use position, battery 110 is placed in battery tray 10 and secured as detailed above.

In the most preferred embodiment, battery tray 10 has a length from end wall 24 to end wall 24 of approximately 12.435 inches, a length between opposing side walls 22 of approximately 7.200 inches, while the length of stop plate 68 as measured between ends 68' is approximately 4.23 inches. In addition, in the most preferred embodiment, the distance between front surfaces 69 of stop plates 68, when adapters 30 are in the use position, is approximately 11.125 inches. These dimensions, in the most preferred embodiment, permit battery tray 10 to support either a Group 30 or Group 24 battery.

Battery tray 10 is preferably monolithic, i.e., formed in one piece of a unitary construction of a polymeric material, by any manufacturing method commonly utilized in the art. Any polymeric material having the requisite strength and rigidity to securely support a battery may be used to form battery tray 10. Furthermore, battery tray 10 meets the requirements detailed in Title 33 Code of Federal Regulations §183.420.

Changes and modifications in the specifically described embodiments can be carried out without departing of the principals of the invention. Therefore, the invention is intended to be limited only by the scope of the appended claims, as interpreted according to the principals of patent law, including the doctrine of equivalents.

The embodiments in which an exclusive property or privilege is claimed are defined as follows:

1. An adaptable battery tray adaptable to receive different sized batteries, said adaptable battery tray comprising a body having a bottom and a pair of opposing end walls defining an interior and at least one adapter movably attached to said body, said body defining a battery receiving area, said at least one adapter being positionable at a first position external to said interior of said body for receiving a battery having a first size, said at least one adapter being positionable at a second position wherein said at least one adapter is positioned at least partially within said interior of said body, wherein said at least one adapter functions to decrease a dimension of said battery receiving area to receive a battery having a second size when said at least one adapter is positioned at said second position, said first battery size being greater than said second battery size.

2. The adaptable battery tray of claim 1, wherein said at least one adapter is rotatably attached to an end wall of said pair of opposing end walls.

3. An adaptable battery tray comprising a body having a bottom and a pair of opposing end walls defining an interior, and at least one adapter movably attached to said body, said at least one adapter movable from a first position external to said interior of said body, to a second position wherein said at least one adapter is positioned within said interior of said body, said at least one adapter being rotatably attached to an end wall of said pair of opposing end walls, wherein said at least one adapter is a pair of adapters, with each adapter of said pair of adapters attached to an end wall of said pair of opposing end walls.

4. The adaptable battery tray of claim 3, wherein each end wall of said pair of opposing end walls has a top edge and each adapter of said pair of adapters is rotatably attached to said top edge.

5. The adaptable battery tray of claim 4, wherein each adapter of said pair of adapters further comprises:
   a first member rotatably coupled to said top edge and spaced a preselected distance therefrom when in said first position, said first member having a surface in contact with said bottom of said body when in said second position; and
   a stop member projecting from said first member.

6. The adaptable battery tray of claim 5, wherein said stop member is substantially orthogonal to said first member and is substantially parallel to said pair of opposing end walls when said adapter is in said second position.

7. The adaptable battery tray of claim 5, wherein each adapter of said pair of adapters further comprises at least one tab projecting from said stop member, said at least one tab having a surface in contact with said bottom of said body when said adapter is in said second position.

8. The adaptable battery tray of claim 1, wherein said bottom is configured to maintain said at least one adapter in said second position.

9. The adaptable battery tray of claim 7, wherein said at least one tab includes an end and said bottom is formed with at least one receiving pin projecting therefrom, said at least one receiving pin frictionally contacting said end of said at least one tab when said at least one adapter is in said second position.

10. The adaptable battery tray of claim 5, wherein each adapter of said pair of adapters further comprises at least one hinge member having a first end attached to said first member, and a second end coupled to said top edge of said end wall.

11. The adaptable battery tray of claim 10, wherein each adapter of said pair of adapters further comprises a hinge attached to said second end of said at least one hinge member and said top edge of said end wall.

12. The adaptable battery tray of claim 11, wherein said hinge is a living hinge.

13. The adaptable battery tray of claim 12, wherein said living hinge has a material thickness that permits manual removal from said body.

14. An adaptable battery tray comprising:
a body having a bottom, a pair of opposing side walls and a pair of opposing end walls defining an interior, said body dimensioned to receive a first battery; and
a pair of adapters, each adapter of said pair of adapters rotatably attached to an end wall of said pair of opposing end walls, said pair of adapters rotatable to a use position within said interior of said body, wherein when in said use position said pair of adapters are configured to permit said body to receive a second battery having a length less than the first battery.

15. The adaptable battery tray of claim 14, wherein each adapter of said pair of adapters is rotatably attached to an end wall of said pair of end walls by a hinge.

16. The adaptable battery tray of claim 15, wherein said hinge is a living hinge.

17. The adaptable battery tray of claim 16, wherein said living hinge has a material thickness that permits manual removal from said body.

18. The adaptable battery tray of claim 14, wherein said body and said pair of adapters are of a unitary construction.

19. The adaptable battery tray of claim 14, wherein each adapter of said pair of adapters further comprises a stop member, and at least one tab projecting substantially orthogonally from said stop member, said stop member being substantially parallel to said pair of opposing side walls when said adapter is in said use position.

20. The adaptable battery tray of claim 19, further comprising a plurality of ribs extending from said bottom, said ribs defining a first contact surface, and wherein said at least one tab has a top surface defining a second contact surface, wherein said first contact surface and said contact surface are substantially co-planar.

21. The adaptable battery tray of claim 14, wherein said bottom is configured to maintain said pair of adapters in said use position.

22. The adaptable battery tray of claim 19, wherein said at least one tab has an end and said bottom includes at least one receiving pin extending therefrom, said at least one receiving pin frictionally contacting said end of said at least one tab when said adapter is in said use position.

23. The adaptable battery tray of claim 14, wherein said pair of adapters are removable from said body.

24. An adaptable battery tray comprising:
a bottom, said bottom having an interior surface;
a pair of end walls extending from said bottom;
a pair of side walls extending from said bottom; and
a pair of adapters, each adapter of said pair of adapters rotatably attached to an end wall of said pair of end walls, each adapter rotatable into a use position, each adapter comprising:
at least one hinge member rotatably attached to an end wall of said pair of end walls;
a stop plate coupled to said at least one hinge member, said stop plate being substantially parallel to said pair of opposing end walls when said adapter is in said use position.

25. The adaptable battery tray of claim 24, wherein said at least one hinge member has an end and each adapter of said pair of adapters further comprises a connector member attached to said end of said at least One hinge member, said stop plate projecting from said connector member.

26. The adaptable battery tray of claim 25, wherein said connector member has a bottom surface in contact with said interior surface when said adapter is in said use position.

27. The adaptable battery tray of claim 24, wherein each adapter of said pair of adapters further comprises at least one tab projecting substantially orthogonally from said stop plate.

28. The adaptable battery tray of claim 27, wherein said at least one tab has a bottom surface in contact with said interior surface of said bottom when said adapter is in said use position.

29. The adaptable battery tray of claim 24, wherein said bottom is configured to secure said pair of adapters in said use position.

30. The adaptable battery tray of claim 28, wherein said at least one tab has an outer surface and said bottom is formed having at least one receiving pin projecting therefrom, said at least one receiving pin frictionally engaging said outer surface of said at least one tab when said adapter is in said use position.

31. The adaptable battery tray of claim 24, wherein each adapter of said pair of adapters are separately rotatable.

32. The adaptable battery tray of claim 24, wherein said bottom, said pair of opposing side walls, said pair of opposing end walls, and said pair of adapters are unitary in construction.

33. The adaptable battery tray of claim 24, wherein said at least one hinge member is rotatably attached to an end wall of said pair of end walls by a hinge.

34. The adaptable battery tray of claim 33, wherein said hinge is a living hinge.

35. The adaptable battery tray of claim 34, wherein said living hinge has a material thickness that permits manual removal from said body.

36. An adaptable battery tray comprising a body having an interior, an interior surface, and a pair of opposing walls, and at least one adapter movably attached to said body, said at least one adapter being movable from a first position external to said interior of said body to a second position wherein said at least one adapter is positioned at least partially within said interior of said body, said battery tray defining a first battery receiving area having a first dimension across said battery tray when said at least one adapter is in said first position said battery tray defining a second battery receiving area having a second dimension across said battery tray when said at least one adapter is in said second position, said first dimension being greater than said second dimension, wherein said body and said at least one adapter are formed of a polymeric material in a unitary construction.

37. The adaptable battery tray of claim 36, wherein said at least one adapter is a pair of adapters.

38. The adaptable battery try of claim 37, wherein each adapter of said pair of adapters is rotatably attached to an end wall of said pair of opposing end walls.

* * * * *

UNITED STATES PATENT AND TRADEMARK OFFICE
CERTIFICATE OF CORRECTION

| | |
|---|---|
| PATENT NO. | : 6,521,371 B1 |
| APPLICATION NO. | : 09/724155 |
| DATED | : February 18, 2003 |
| INVENTOR(S) | : Richard A. Lavanture |

It is certified that error appears in the above-identified patent and that said Letters Patent is hereby corrected as shown below:

In the Abstract
Line 12, "dimensions." should be --dimension.--

Column 2
Line 3, insert --top-- after "battery"
Line 25, "when in use" should be --when not in use--

Column 3
Line 40, "ray" should be --may--
Line 53, delete "a" before "attached"
Line 54, "340" should be --30--
Line 65, insert --,-- after "respectively"
Line 66, delete "," after "surface"
Line 67, "rib" should be --ribs--

Column 4
Line 6, insert --tray-- after "battery"

Column 5
Line 46, "frictional gaging" should be --frictionally engaging--

Column 7
Claim 24, Line 65, "wails" should be --walls--

UNITED STATES PATENT AND TRADEMARK OFFICE
CERTIFICATE OF CORRECTION

PATENT NO. : 6,521,371 B1
APPLICATION NO. : 09/724155
DATED : February 18, 2003
INVENTOR(S) : Richard A. Lavanture It is certified that error appears in the above-identified patent and that said Letters Patent is hereby corrected as shown below:

Column 8
Claim 25, Line 12, "One" should be --one--
Claim 38, Line 63, "try" should be --tray--

Signed and Sealed this

Twentieth Day of January, 2009

JON W. DUDAS
*Director of the United States Patent and Trademark Office*